A. Sherman.
Tailoring.
N° 283. Patented Jul. 17. 1837.
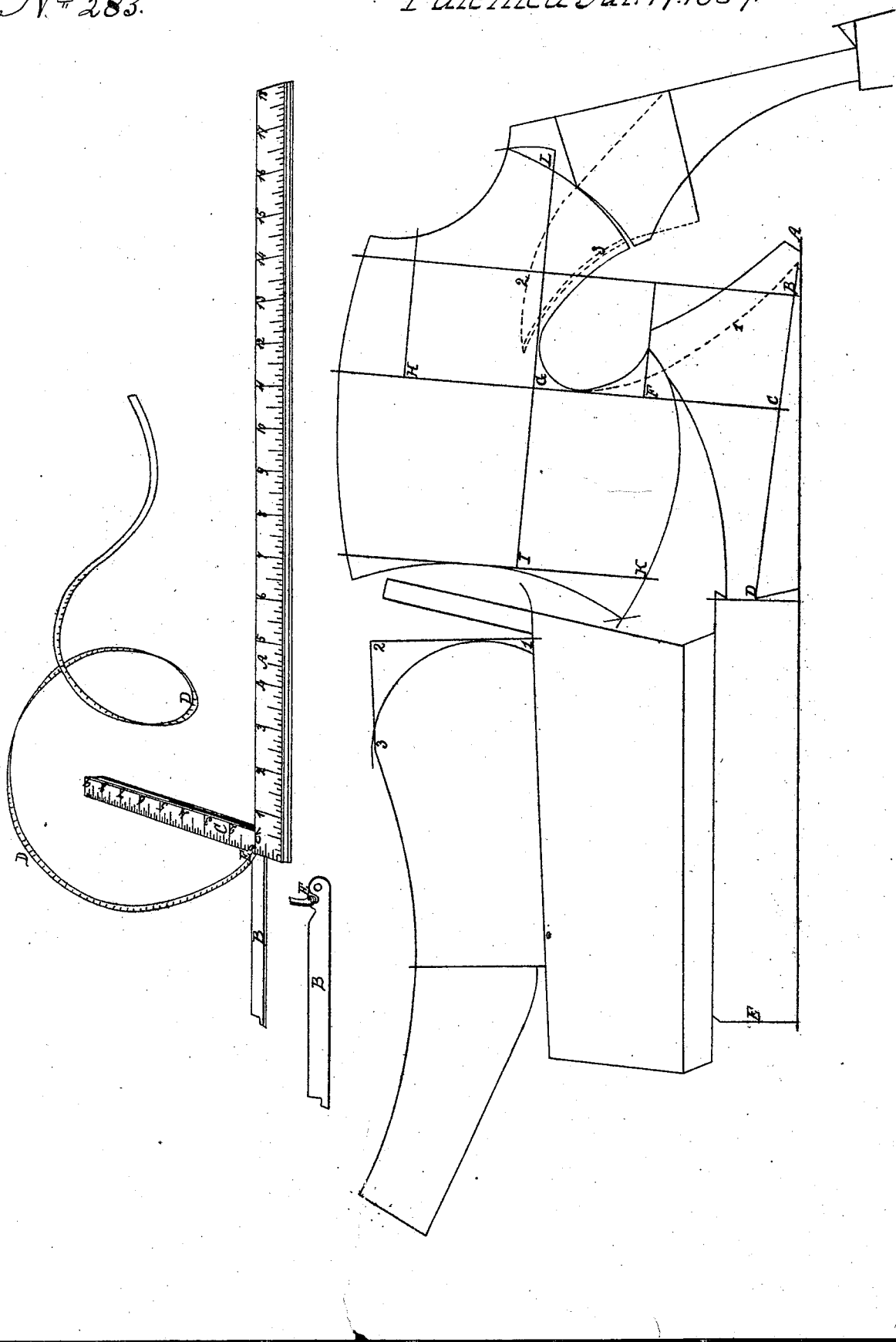

UNITED STATES PATENT OFFICE.

AMOS SHERMAN, OF NEWARK, NEW JERSEY.

SYSTEM OF TAILORING.

Specification of Letters Patent No. 283, dated July 17, 1837.

*To all whom it may concern:*

Be it known that I, AMOS SHERMAN, of Newark, in the county of Essex and State of New Jersey, have invented a new and useful improvement in taking the measure for, and cutting clothes, called " Sherman's Improved System of Tailoring", which is described as follows, reference being had to the annexed diagrams of the same, making part of this specification.

I make use of the ordinary mechanic's square A with a projection B forming a right angle with its small arm C on a line with the inside of the long arm. This projection may be in the form of a blade, closing like that of a jack knife, or it may be permanently fixed in its place. Its use is to measure the shape of a man's body—the manner of using being as follows.

The person to be measured is to stand with his back toward you in a natural position; place the small arm of the square under his arm close to the arm pits with the long arm running horizontally across the back; then make a dot immediately above the square at the center back seam: then place the square in the same position on the shoulder, the small arm being directly over the arm pit and make a dot under the square at the back seam: then place the long arm of the square perpendicularly at the side, with the projection touching the front of the shoulder, and the small arm close up to the arm pit; make a dot at the hip—then with a tape-measure, secured on the hook on the projection of the square, take the distance to the first mentioned dot; then carry the measure up to the collar at the top of the back seam; then take the measure front of the shoulder and carry it to the same point; then over the center of the shoulder seam down to the first mentioned dot: next pass the measure around the sleeve head down to the square, back of the arm. All the above measures start from the same point, namely, the hook on which the tape measure is placed. Take the distance on the square down to the hip; the square is then dispensed with. Take the distance from the hip dot with the tape measure to the center of back at the waist: then place the tape at the top of the back; take the distance to the upper dot, the lower one, the length of the waist and skirt. Then place the tape at the back seam half way between the dots—take the width of back, the distance to the elbow and to the hand; measure around the breast, waist, and arm, which completes the measuring. D tape attached to a hook E on the blade, at the angle formed by its intersection with the short arm of the square.

For the application to the cloth see diagram and measure table.

*Measure Table—Classes.*

|  |  | 1 |  | 2 | 3 | 4 | 5 | 6 |
|---|---|---|---|---|---|---|---|---|
| From A to B is No.1 | Class 4 |  |  |  |  |  |  |  |
| From A to C is No. 2 | Class 4 | 1 | 10¾ | 11½ | 8 | 2¼ | 6½ | 17 |
| From A to D is No. 3 | Class 4 | 2 | 14¼ | 15½ | 7½ | 7½ | 20 | 15 |
| From A to E is No. 4 | Class 4 | 3 |  | 12 |  | 16½ | 34 | 5¾ |
| From C to F is No. 1 | Class 5 | 4 |  |  |  | 38 |  | 4¼ |
| From C to G is No. 1 | Class 1 |  |  |  |  |  |  |  |
| From C to H is No. 1 | Class 6 |  |  |  |  |  |  |  |
| From G to I is No. 1 | Class 3 |  |  |  |  |  |  |  |
| From I to K is No. 2 | Class 3* |  |  |  |  |  |  |  |
| From G to L is No. 1 | Class 2† |  |  |  |  |  |  |  |

* Deducting width of back at the waist.
† Deducting width of back at the top.

No. 2, class 1, and Nos. 2 and 3, class 2, are applied at the dotted lines on diagram marked 1, 2, 3—No. 1, class 4, will balance the shoulder correctly for every shape by applying it from L forward on the curve for the upper point of the shoulder.

The sleeve head is produced as follows— the distance from 1 to 2 is half the distance around the scye; from 2 to 3 is the distance from F to G on the body of the coat. The remainder is formed as per diagram.

The invention claimed by me the said AMOS SHERMAN and which I desire to secure by Letters Patent consists in—

The before described method of taking measure and cutting clothes—also the addition of the projection or blade to the square and attaching the tape to the hook E, of the blade, as above described.

AMOS SHERMAN.

Witnesses:
 DANIEL PIERSON,
 CHARLES T. STEPHENS.